United States Patent
Nakada et al.

(10) Patent No.: US 9,018,551 B2
(45) Date of Patent: Apr. 28, 2015

(54) HANDLEBAR SWITCH FOR MOTORCYCLE

(71) Applicant: Honda Motor Co., Ltd, Tokyo (JP)

(72) Inventors: Naoki Nakada, Wako (JP); Hiroyasu Ota, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 276 days.

(21) Appl. No.: 13/847,868

(22) Filed: Mar. 20, 2013

(65) Prior Publication Data

US 2013/0256103 A1    Oct. 3, 2013

(30) Foreign Application Priority Data

Mar. 29, 2012    (JP) ................. 2012-077568

(51) Int. Cl.
| | | |
|---|---|---|
| *H01H 9/00* | (2006.01) | |
| *B62K 23/02* | (2006.01) | |
| *B62K 11/14* | (2006.01) | |
| *H01H 25/00* | (2006.01) | |
| *H01H 9/06* | (2006.01) | |

(52) U.S. Cl.
CPC ................. *B62K 23/02* (2013.01); *B62K 11/14* (2013.01); *H01H 25/008* (2013.01); *H01H 2009/068* (2013.01)

(58) Field of Classification Search
CPC ...... B62K 23/02; B62K 5/01; B62K 2202/00; B62K 21/12; B62K 23/00; B62K 11/14; F16H 61/143; H01H 2009/068; H01H 9/06; H01H 2009/066; H01H 25/008; H01H 3/022; H01H 9/0207; H01H 21/22; H01H 21/24; H01H 23/16; H01H 23/162; H01H 2021/18; H01H 2021/24; H01H 2205/004; B62J 6/16; B60R 2325/306

USPC ............................................ 200/61.54, 61.85
See application file for complete search history.

(56) References Cited

U.S. PATENT DOCUMENTS

| | | | | |
|---|---|---|---|---|
| 4,361,739 | A * | 11/1982 | Harata et al. ................. | 200/16 C |
| 4,847,454 | A * | 7/1989 | Hiruma ....................... | 200/61.85 |
| 6,225,584 | B1* | 5/2001 | Ase et al. .................... | 200/61.54 |
| 7,332,684 | B2* | 2/2008 | Tozuka et al. .............. | 200/61.27 |
| 7,402,767 | B2* | 7/2008 | Tozuka et al. .............. | 200/61.54 |
| 7,560,656 | B2* | 7/2009 | Okatani et al. ............... | 200/559 |
| 8,350,171 | B2* | 1/2013 | Chang .......................... | 200/312 |
| 2007/0278072 | A1* | 12/2007 | Tozuka et al. ................ | 200/61.3 |
| 2008/0164991 | A1* | 7/2008 | Shimizu et al. .............. | 340/476 |
| 2011/0284349 | A1* | 11/2011 | Chang .......................... | 200/312 |

FOREIGN PATENT DOCUMENTS

JP    2003-022731 A    1/2003

* cited by examiner

*Primary Examiner* — Kyung Lee
(74) *Attorney, Agent, or Firm* — Westerman, Hattori, Daniels & Adrian, LLP

(57) ABSTRACT

A handlebar switch for a motorcycle that achieves reduction in size of a switch case, while enhancing a degree of freedom in layout of a plurality operating and other types of switches. A handlebar switch includes: a switch case that includes case half bodies, joined together across a handlebar and a plurality of operating switches, such as a horn switch, protruding from the switch case; and a substrate disposed inside the switch case in a position substantially orthogonal to a direction of an axis of the handlebar, the substrate having a plurality of contacts for generating electric signals in a manner operatively associated with an operation of the operating switch. In the handlebar switch, each of the contacts is electrically connected by pressure applied in a direction substantially identical to the direction of the axis of the handlebar.

16 Claims, 9 Drawing Sheets

HANDLEBAR SWITCH FOR MOTORCYCLE

CROSS-REFERENCE TO RELATED APPLICATION

The present application claims priority under 35 U.S.C. §119 to Japanese Patent Application No. 2012-077568, filed Mar. 29, 2012, the contents of which is incorporated herein, by reference, in its entirety.

TECHNICAL FIELD

The handlebar switch relates generally to handlebar switches for motorcycles and, more particularly, to a handlebar switch for a motorcycle to be mounted on a handlebar for operating a lighting device and other parts.

BACKGROUND OF THE INVENTION

A known handlebar switch is to be mounted on a steering handlebar to thereby allow an occupant of a motorcycle to turn on or off a headlight or perform related operations with his or her hands left on the steering handlebar. Various types of structures have been proposed in such a handlebar switch for minimizing a space for installing the handlebar switch.

Japanese Patent Laid-open No. 2003-22731 discloses a handlebar switch in which a substrate for a headlight dimmer switch (a light axis selector switch) is disposed perpendicularly relative to a handlebar, thereby reducing a dimension in a handlebar axial direction.

SUMMARY OF THE INVENTION

A plurality of operating and other types of switches is disposed in a switch case of a handlebar switch. Having different substrates, one for the dimmer switch and the other for other switches, as disclosed in Japanese Patent Laid-open No. 2003-22731 results in not only an increased number of parts used, but also a larger switch case as a result of disposing the substrates. Moreover, restrictions are imposed on disposition of the operating switches. All can lead to reduced degrees of freedom in design.

handlebar switch A handlebar switch for a motorcycle can achieve reduction in size of a switch case, while enhancing a degree of freedom in layout of a plurality operating and other types of switches.

A first characteristic of the handlebar switch provides a handlebar switch for a motorcycle, including a switch case and a substrate. The switch case includes: two separate case half bodies joined together across a handlebar; and a plurality of operating switches protruding from the switch case, the operating switches for operating electric devices of the motorcycle. The substrate is disposed inside the switch case in a position substantially orthogonal to a direction of an axis of the handlebar and have a plurality of contacts for generating electric signals in a manner operatively associated with an operation of the operating switch. In the handlebar switch, the operating switch includes direction change mechanisms for changing an operating direction of the operating switch to a corresponding moving direction of the contact; and the contacts are disposed on both sides of the substrate.

In a second characteristic of the handlebar switch, the contact is electrically connected by pressure applied in a direction substantially identical to the direction of the axis of the handlebar; and the direction change mechanisms change a direction of the pressure applied to the operating switch to the direction substantially identical to the direction of the axis of the handlebar.

In a third characteristic of the handlebar switch, the direction change mechanisms include a wedge-shaped cam mechanism that includes: an inclined surface portion disposed to face the contact and formed on an actuator moving in the direction substantially identical to the direction of the axis of the handlebar; and an operator reciprocating in response to an operation of the operating switch and abutting on the inclined surface portion; and as the operating switch is operated, the operator presses the inclined surface portion, which results in the actuator being pressed in the direction substantially identical to the direction of the axis of the handlebar.

In a fourth characteristic of the handlebar switch, the inclined surface portion is inclined substantially 45 degrees relative to the direction of the axis of the handlebar.

In a fifth characteristic of the handlebar switch, the contact is electrically connected through a contact thereof with a facing contact disposed to face the contact; and an urging force is applied at all times to each of the operator and the facing contact in a direction of returning each to a neutral position.

In a sixth characteristic of the handlebar switch, an urging force is applied to the operator by an elastic force of a spring member in a direction of returning the operator to the neutral position; and an urging force is applied to the facing contact by an elastic force of a sheet member on which the facing contact is disposed in a direction of returning the facing contact to the neutral position.

In a seventh characteristic of the handlebar switch, the substrate is formed so as to curve to surround an outer peripheral portion of the handlebar, extending across both the case half bodies of the switch case.

In an eighth characteristic of the handlebar switch, the operator and the inclined surface portion of the actuator have recess and protrusion parts that are engaged with each other when the operator is pressed.

In a ninth characteristic of the handlebar switch, the handlebar switch further includes: sheet members disposed on both sides of the substrate and on which the facing contacts are disposed; case members disposed on an outside of the sheet members and in which the direction change mechanisms are disposed; and a switch unit disposed inside the switch case, the switch unit including the substrate, the sheet members, and the case members.

In a tenth characteristic of the handlebar switch, the operating switches include a turn signal switch configured such that turn signal operators having a shape to be disposed on both sides of the substrate can press the contacts disposed on both sides of the substrate.

In the first characteristic of the handlebar switch, the operating switch includes the direction change mechanisms for changing the operating direction of the operating switch to a corresponding moving direction of the contact and the contacts are disposed on both sides of the substrate. This allows a plurality of switches on the substrate to be operated without needing to dispose a plurality of substrates in the switch case. A plurality of switches can therefore be disposed with a high degree of freedom, while the switch case can be avoided from becoming large in size.

In the second characteristic of the handlebar switch, the contact is electrically connected by pressure applied in the direction substantially identical to the direction of the axis of the handlebar and the direction change mechanisms change the direction of the pressure applied to the operating switch to the direction substantially identical to the direction of the axis of the handlebar. Reduction in size of the switch case can therefore be achieved.

In the third characteristic of the handlebar switch, the direction change mechanisms include a wedge-shaped cam mechanism that includes: the inclined surface portion disposed to face the contact and formed on an actuator moving in the direction substantially identical to the direction of the axis of the handlebar; and the operator reciprocating in response to an operation of the operating switch and abutting on the inclined surface portion. As the operating switch is operated, the operator presses the inclined surface portion, which results in the actuator being pressed in the direction substantially identical to the direction of the axis of the handlebar. The direction in which the operating force acts can therefore be changed with a simple and compact mechanism.

In the fourth characteristic of the handlebar switch, the inclined surface portion is inclined substantially 45 degrees relative to the direction of the axis of the handlebar. The operating force on the operating switch applied in a direction substantially perpendicular to the direction of the axis of the handlebar can therefore be smoothly changed to the moving direction of the switch.

In the fifth characteristic of the handlebar switch, the contact is electrically connected through a contact thereof with a facing contact disposed to face the contact; and an urging force is applied at all times to each of the contact and the facing contact in the direction of returning each to the neutral position. The switch can therefore be reliably turned off upon release of the operating force.

In the sixth characteristic of the handlebar switch, an urging force is applied to the operator by the elastic force of the spring member in a direction of returning the operator to the neutral position; and an urging force is applied to the facing contact by an elastic force of the sheet member on which the facing contact is disposed in a direction of returning the facing contact to the neutral position. This allows a minimum urging force required for returning each of the operator and the actuator to the neutral position to be applied thereto. An arrangement not applying load to each part can thus be achieved.

In the seventh characteristic of the handlebar switch, the substrate is formed so as to curve to surround the outer peripheral portion of the handlebar, extending across both the case half bodies of the switch case. A space inside the switch case can thus be effectively used to expand the area of the substrate, allowing a large number of switches to be disposed on a single substrate.

In the eighth characteristic of the handlebar switch, the operator and the inclined surface portion of the actuator have the recess and protrusion protrusion parts that are engaged with each other when the operator is pressed. A click feel can therefore be given when the pressure operation on the operator is completed.

In the ninth characteristic of the handlebar switch, the handlebar switch further includes: the sheet members disposed on both sides of the substrate and on which the facing contacts are disposed; the case members disposed on the outside of the sheet members and in which the direction change mechanisms are disposed; and the switch unit disposed inside the switch case, the switch unit including the substrate, the sheet members, and the case members. This arrangement allows a subassembled switch unit to be built into the switch case easily, so that reduction in the number of production man-hours can be achieved. In addition, the substrate can be applied to a vehicle model having a different switch configuration.

In the tenth characteristic of the handlebar switch, the turn signal switch of the operating switches is configured such that the turn signal operators having a shape to be disposed on both sides of the substrate can press the contacts disposed on both sides of the substrate. The turn signal switch can therefore be configured compactly.

BRIEF DESCRIPTION OF THE DRAWINGS

The advantages of the invention will become apparent in the following description taken in conjunction with the drawings wherein.

DETAILED DESCRIPTION OF THE INVENTION

Figure 1:
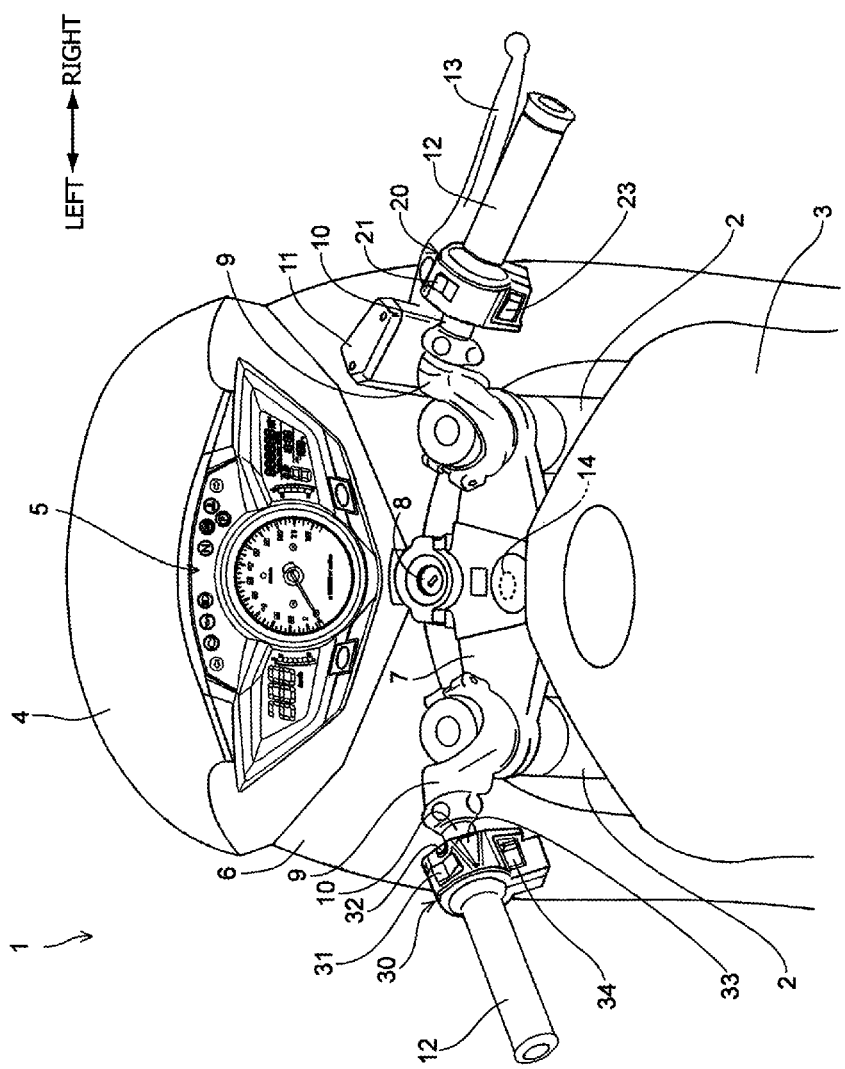
FIG. 1 is a partial enlarged view showing an area around a meter of a motorcycle to which a handlebar switch for a motorcycle according to an embodiment of the handlebar switch is applied.

Preferred embodiments of the handlebar switch will be described in detail below with reference to the accompanying drawings. FIG. 1 is a partial enlarged view showing an area around a meter of a motorcycle 1 to which a handlebar switch for a motorcycle is applied. FIG. 1 looks down at an area around a handlebar from rearward and upward directions of a vehicle body. FIG. 1 approximates a view as viewed from a rider who sits on a seat. A cowling 6 as an exterior part covers an area forward along the vehicle body of steering handlebars 9 that steer a front wheel (not shown). A windshield screen 4 is attached to an upper end portion of the cowling 6. A meter device 5 is disposed downwardly of the windshield screen 4. The meter device 5 includes, for example, a tachometer, a left liquid crystal panel that displays a vehicle speed, and a right liquid crystal panel that includes a trip meter.

A front wheel (not shown) of a motorcycle 1 is rotatably journaled at a lower end of a pair of left and right front forks 2. A top bridge 7 on which a main switch 8 is mounted connects and fixes together upper portions of the front forks 2. The top bridge 7 is rotatably mounted on a vehicle body frame of the motorcycle 1 via a steering stem 14. The steering handlebars 9 are fixed to upper end portions of the front forks 2. A fuel tank 3 is disposed between the top bridge 7 and the seat.

Handlebars 10 formed of a metal, such as aluminum, of the left and right steering handlebars 9 are each attached with a handlebar grip 12 formed of, for example, tubular rubber onto which the rider holds. A front wheel brake lever 13 is disposed forwardly along the vehicle body of the right handlebar grip 12. A reservoir tank 11 for storing hydraulic fluid of a hydraulic brake system is mounted at a proximal portion of the front wheel brake lever 13. The right handlebar grip 12 is supported rotatably relative to the handlebar 10. Rotational operation on the right handlebar grip 12 results in a throttle mechanism being operated.

A right handlebar switch 20 including operating switches for various types of electric devices is mounted adjacent to the handlebar grip 12 on the right steering handlebar 9. The right handlebar switch 20 includes a box-shaped switch case formed of, for example, a resin in which an engine stop switch 21 and a starter switch 23 are disposed. The engine stop switch 21 is a rocker type that retains a position of a first side or a second side until an operating force is applied otherwise. When placed in an off position during engine operation, the engine stop switch 21 brings the engine to an emergency stop by stopping drive of an ignition system. The starter switch 23 is of a pressure type disposed at a lowermost position of the right handlebar switch 20. The starter switch 23 is operated to start the engine when the main switch 8 is in the on position and an automatic transmission is in neutral.

A left handlebar switch 30 (may hereinafter be referred to simply as a handlebar switch) including operating switches for various types of electric devices is mounted adjacent to a vehicle body central side of the handlebar grip 12 on the left steering handlebar 9. A headlight light axis selector switch 31, a horn switch 33, a turn signal switch 34, and a hazard lamp switch 32 are disposed in the left handlebar switch 30.

Figure 2:
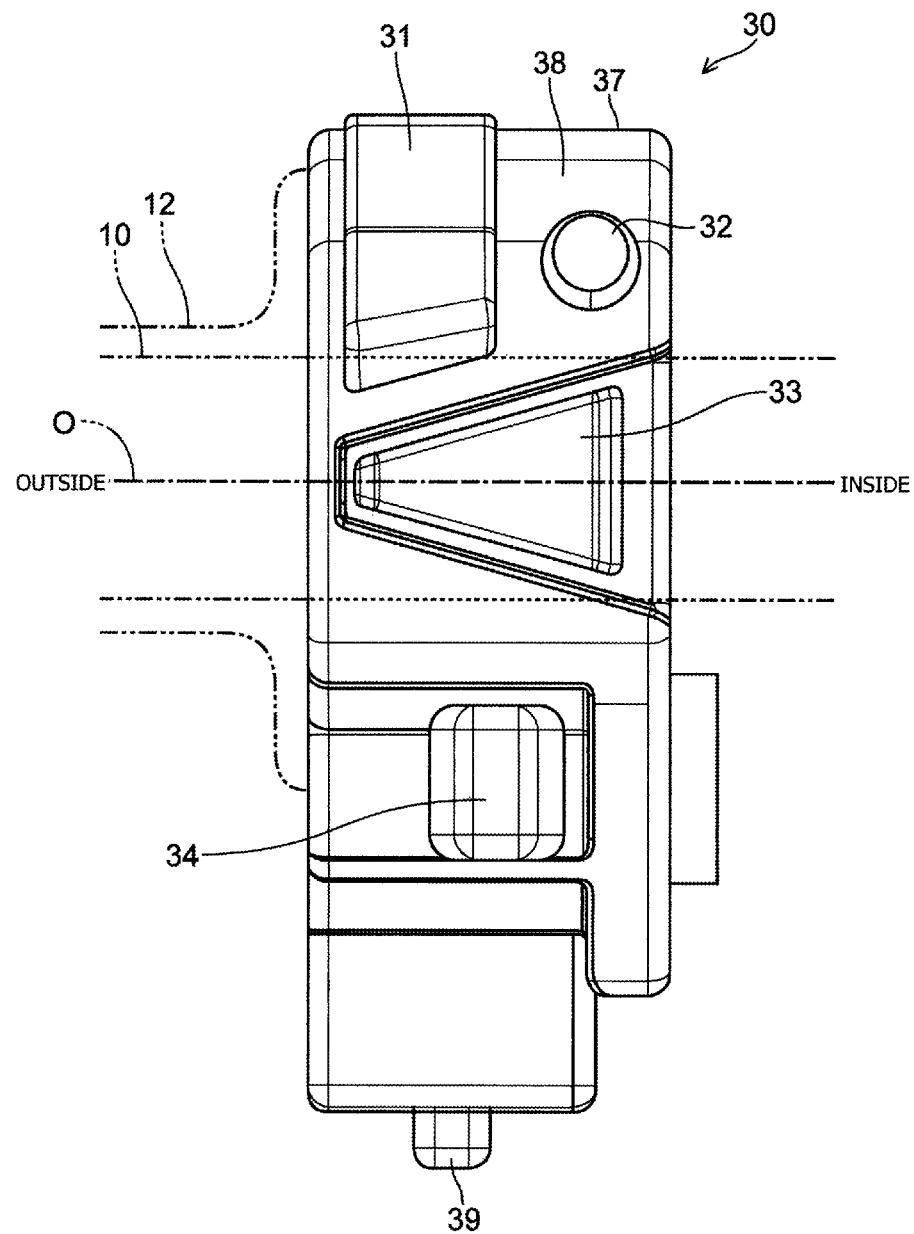
FIG. 2 is a front elevational view showing the handlebar switch as viewed from a rider who sits on a seat of the motorcycle.

FIG. 2 is a front elevational view showing the left handlebar switch 30 as viewed from a rider who sits on the seat. Directional expressions of "inside" and "outside" shown in FIG. 2 indicate an inner side direction and an outer side direction, respectively, in the vehicle width direction. The handlebar switch 30 includes a box-shaped switch case 37 formed of, for example, a resin in which a plurality of switches for operating various types of electric devices is disposed.

The horn switch 33 of a rock and press type is disposed at a substantially identical height in a vehicle body vertical direction relative to an axis O of the handlebar 10. The light axis selector switch 31 of a rocker type is disposed above the horn switch 33. The light axis selector switch 31 is configured such that pressing an upper side thereof produces a high beam, pressing a lower side thereof produces a low beam, and pressing the lower side further in a low beam mode produces a passing light. The hazard lamp switch 32 is disposed on the right of the light axis selector switch 31. The hazard lamp switch 32 switches between on and off states when a cylindrical operator is protruded therefrom or retracted therein. The turn signal switch 34 is disposed at a lower portion of the horn switch 33. Tilting an operator of the turn signal switch 34 to one side causes the turn signal switch 34 to activate a left or right turn signal.

Figure 3:
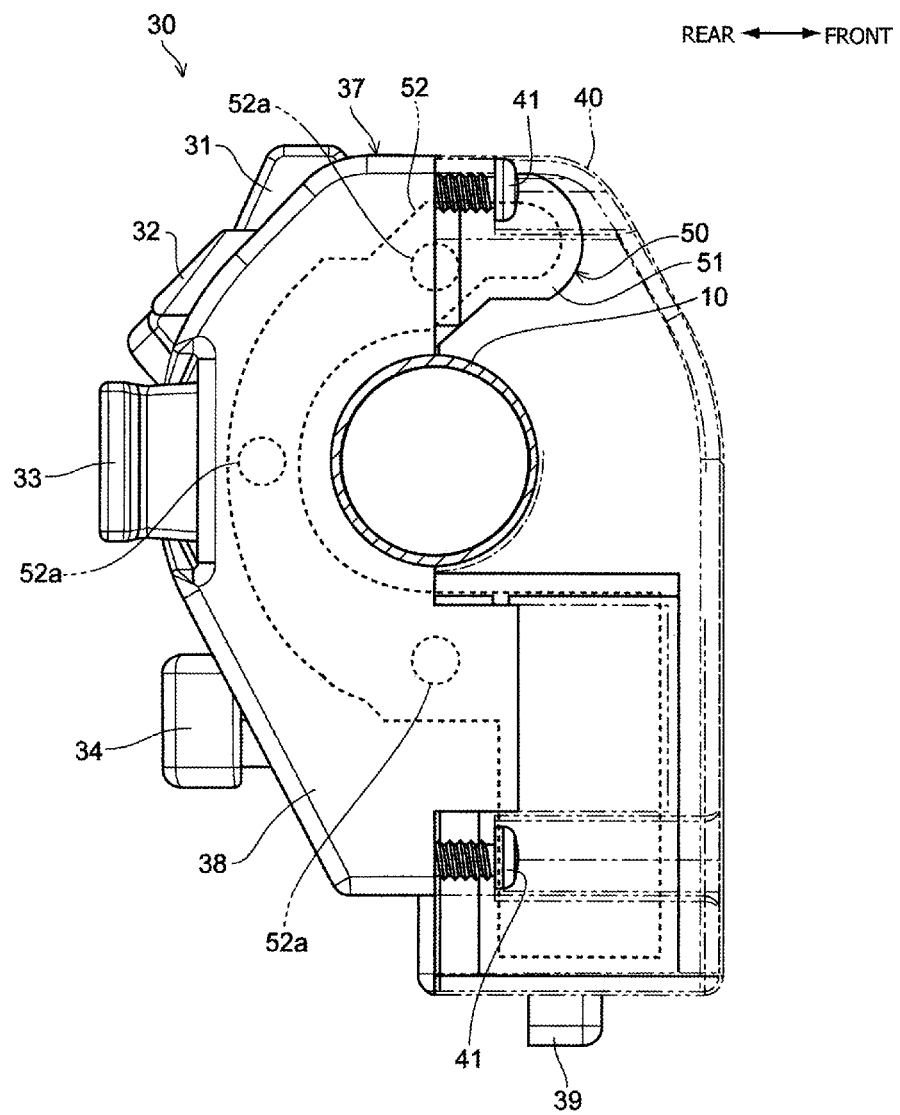
FIG. 3 is a side elevational view showing the handlebar switch as viewed from an inside in a vehicle width direction along a handlebar axial direction.
Figure 4:
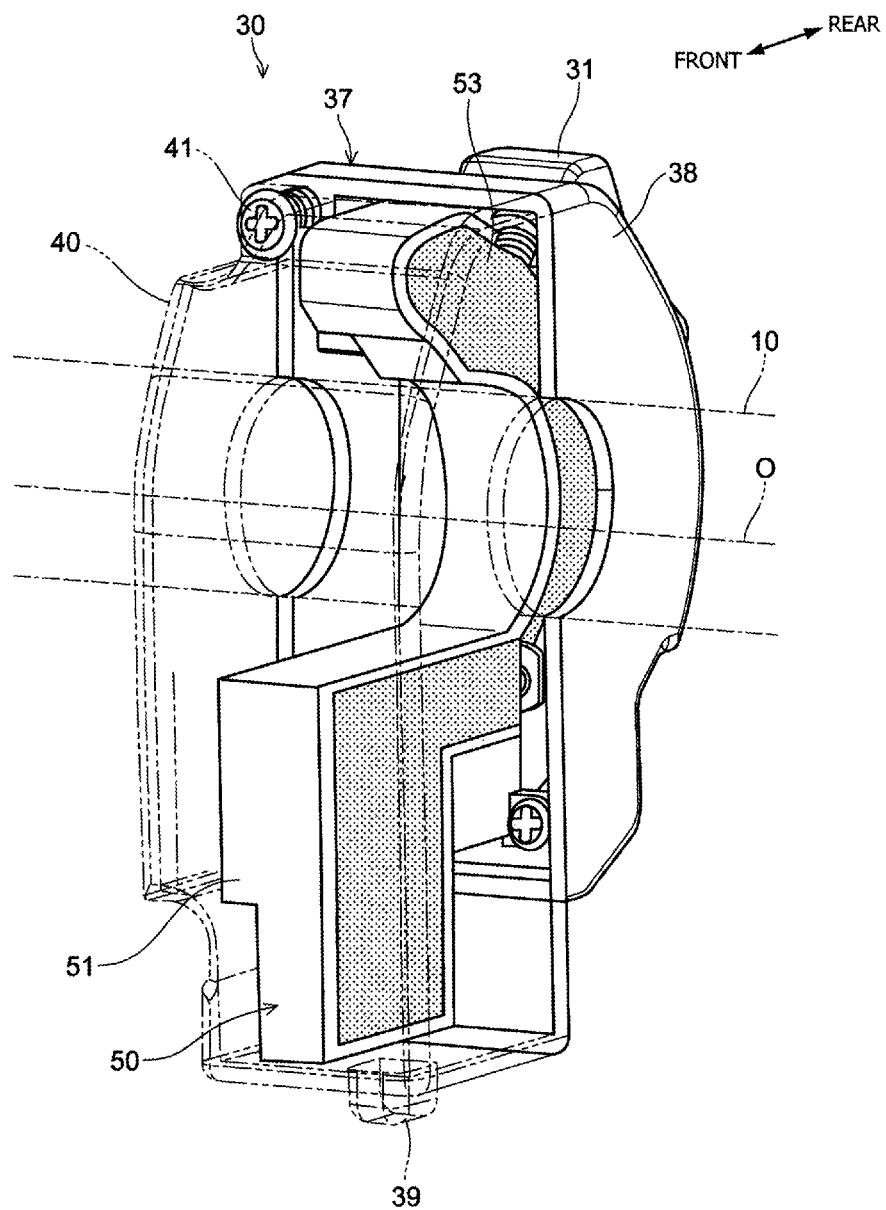
FIG. 4 is a perspective view showing the handlebar switch as viewed from a vehicle body forward side.

FIG. 3 is a side elevational view showing the handlebar switch 30 as viewed from the inside in the vehicle width direction along an axial direction of the handlebar 10. FIG. 4 is a perspective view showing the handlebar switch 30 as viewed from a vehicle body forward side. FIGS. 3 and 4 show a front side case half body 40 in a transparent condition.

The handlebar switch 30 according to the preferred embodiment of the handlebar switch includes a substrate 52 disposed inside the switch case 37 in a position substantially orthogonal to the direction of the axis O of the handlebar 10. The substrate 52 has a plurality of contacts 52a for generating electric signals in a manner operatively associated with a switch operation. The contacts 52a are configured so as to be electrically connected by pressure applied in the direction of the axis O.

The switch case 37 includes a rear side case half body 38 disposed on the side of the occupant and the front side case half body 40 disposed forwardly along the vehicle body. Fastening the rear side case half body 38 with the front side case half body 40 using a plurality of fastening bolts 41 causes the switch case 37 to be fixed to the handlebar 10. The front side case half body 40 has a protruding section 39 for water removal formed in a bottom portion thereof. It is noted that the right handlebar switch 20 has substantially the same structure in that a substrate 52 is disposed in a vertical position.

The substrate 52 extends across the rear side case half body 38 and the front side case half body 40 so as to surround part of an outer periphery of the handlebar 10. A switch unit 50 includes at least the substrate 52 and case members 51 and 53 having a substantially similar figure to the substrate 52 to store therein the substrate 52.

Figure 5:
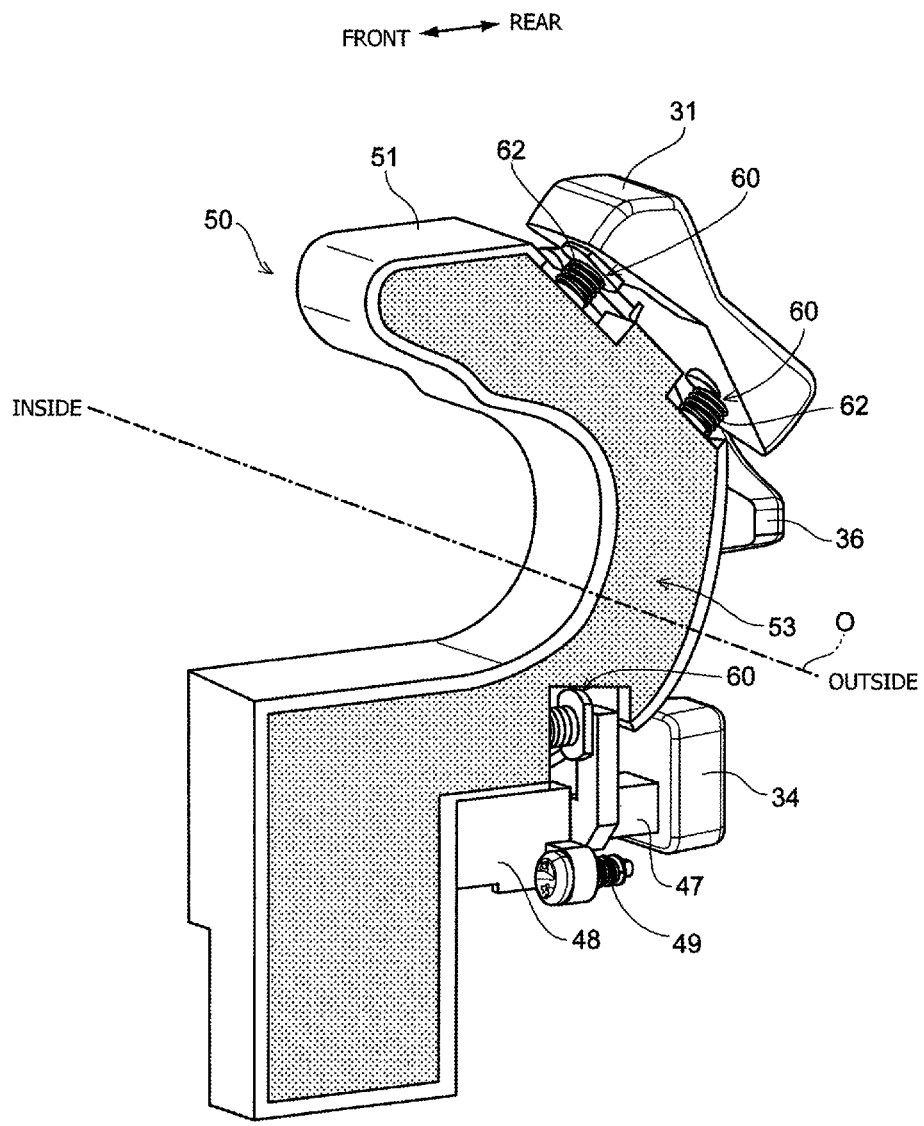
FIG. 5 is a perspective view showing a switch unit and operating switches.
Figure 6:
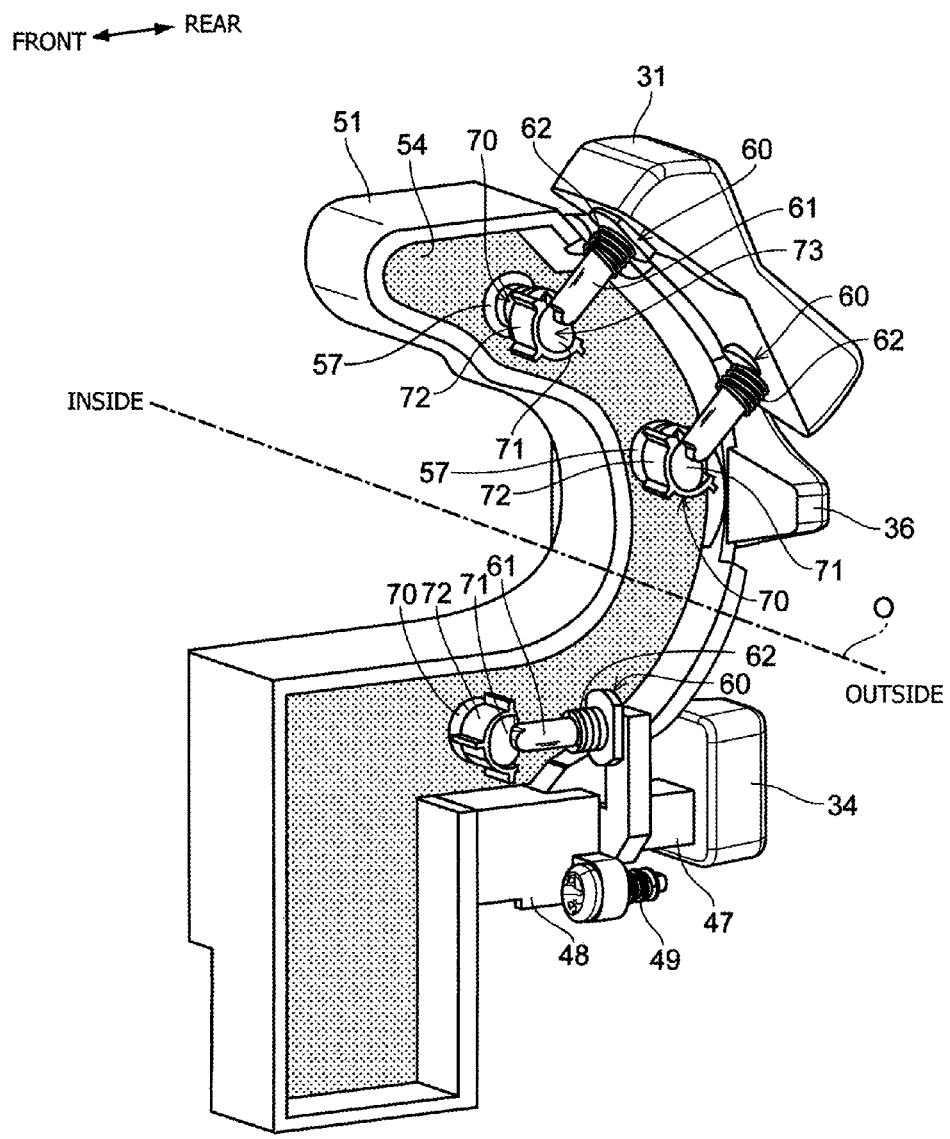
FIG. 6 is a perspective view showing a condition in which a case member is removed from the switch unit shown in FIG. 5.

FIG. 5 is a perspective view showing the switch unit 50 and operating switches. FIG. 6 is a perspective view showing a condition in which the case member 53 is removed from the switch unit 50 shown in FIG. 5. The case member 51 houses therein switch side direction change mechanisms 60 and contact side direction change mechanisms 70 associated with respective switch contacts. Each pair of the switch side direction change mechanisms 60 and the contact side direction change mechanism 70 constitutes a direction change mechanism that changes a direction of pressure applied to each switch to a corresponding direction along the axis O of the handlebar 10.

The switch side direction change mechanisms 60 include an operator 61 and a spring member 62. Specifically, the operator 61 includes a bar-shaped portion and a flange portion. The spring member 62 contacts the flange portion to thereby apply an urging force in a direction of returning the operator 61 to a neutral position. The bar-shaped portion of the operator 61 is inserted in a through hole 61a (see FIG. 8) formed in a direction change mechanism storage section of the case member 51 and thus held in place reciprocally movably in the direction substantially orthogonal to the axis O.

The contact side direction change mechanism 70 includes an actuator 71 and a guide 72. Specifically, the actuator 71 has an inclined surface portion 73 that abuts on a leading end of the operator 61. The guide 72 holds the actuator 71 reciprocally movably in the direction of the axis O of the handlebar 10. Each guide 72 is fixed in the direction change mechanism storage section. For convenience sake, FIG. 6 shows both the switch side direction change mechanisms 60 and the contact side direction change mechanism 70 floating in the air. In actual disassembly, however, the switch side direction change mechanisms 60 and the contact side direction change mechanism 70 are removed with the case member 53 from the switch unit 50.

Each direction change mechanism has a common arrangement and the light axis selector switch 31 will be exemplarily described below. When the upper side of the light axis selector switch 31 is pressed to use the high beam, the bar-shaped portion of the operator 61 is pushed into an inside of the direction change mechanism storage section. At this time, the bar-shaped portion of the operator 61 abuts on the inclined surface portion 73 that is inclined substantially 45 degrees relative to the direction of the axis O of the handlebar 10. The direction in which the pressure is applied to the actuator 71 is therefore changed to the direction of the axis O of the handlebar 10. The actuator 71 is pushed in a direction of approaching the substrate 52 along the guide 72 by the pressure with its direction changed to the direction of the axis O by action of the direction change mechanism as a wedge-shaped cam mechanism. When the actuator 71 is pushed in as a result of the switch operation, a disc-shaped facing contact storage section 57 formed in a sheet member 54 is pushed in a direction of approaching the substrate 52. The sheet member 54 is formed of a resin, such as rubber. Using elasticity of the material, the sheet member 54 applies an urging force to bring the facing contact storage section 57 back to a neutral position when the operating force is released.

The turn signal switch 34 is configured so as to be tilted to the left or right to select the left or right turn signal and pushed in a forward direction along the vehicle body to stop the operation of the turn signal. An operating force on the turn signal switch 34 is transmitted to the contact side direction change mechanism 70 disposed on either side of the substrate 52 by a turn signal operator 47 having a pressure portion that extends across both sides of the substrate 52. To enable the tilting operation and the sliding operation in the vehicle body longitudinal direction, the turn signal operator 47 is supported by a holder 48 that is fixed to the rear side case half body 38 with a screw 49. The contact side direction change mechanism 70 associated with the horn switch 33 is disposed on a surface on the inside in the vehicle width direction of the substrate 52.

Figure 7:
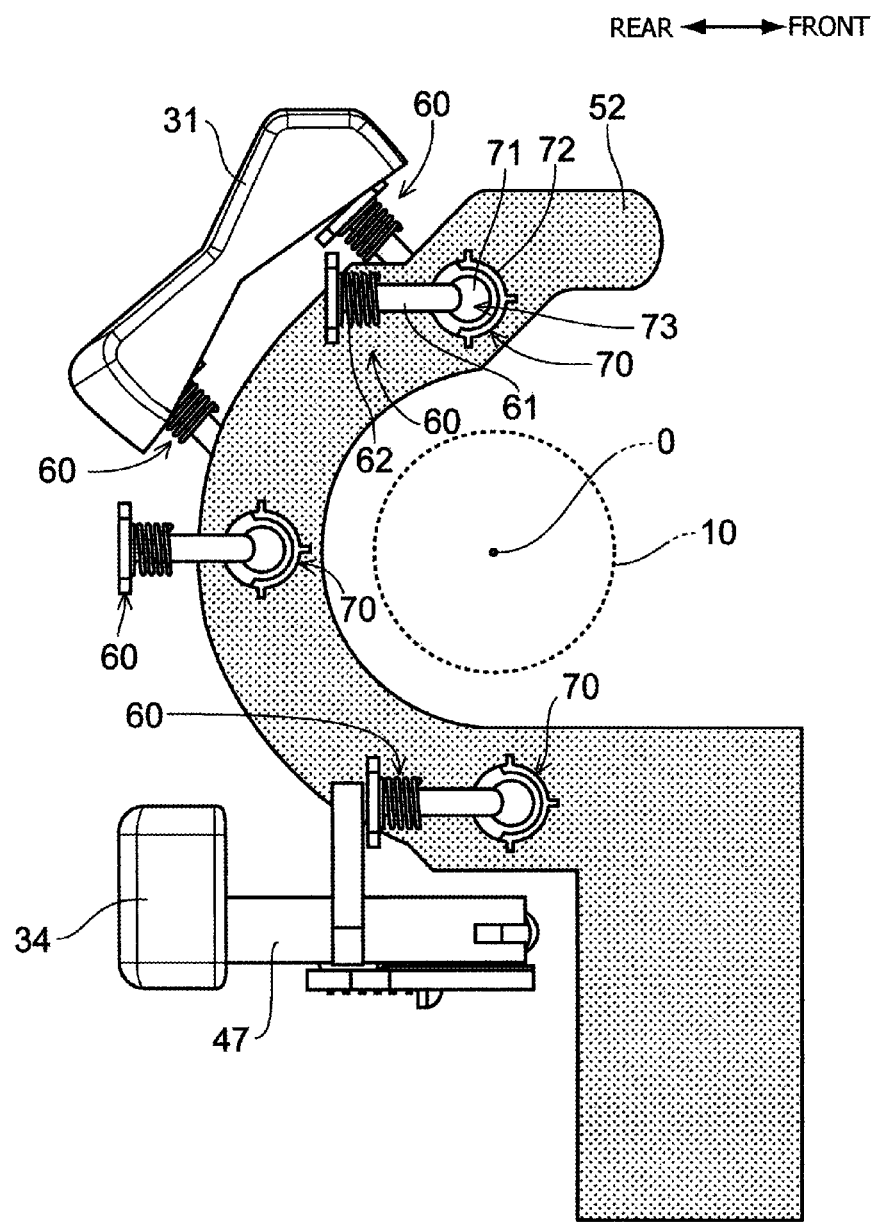
FIG. 7 is a front elevational view showing a substrate as viewed from the inside in the vehicle width direction along the handlebar axial direction.

FIG. 7 is a front elevational view showing the substrate 52 as viewed from the inside in the vehicle width direction along the axial direction of the handlebar 10. As described earlier, the substrate 52 is formed so as to curve to surround the outer peripheral portion of the handlebar 10, extending across both the rear side case half body 38 and the front side case half body 40 of the switch case 37. The substrate 52 also has the contacts 52a disposed on both sides thereof to thereby allow a large number of switches to be laid out thereon in a variety of ways. In addition, varying the direction in which the inclined surface portion 73 of the actuator 71 is oriented such that the direction in which the operator 61 associated with the light axis selector switch 31 slides widely differs from the direction in which the operator 61 associated with the hazard lamp switch 32 slides increases the number of operating directions to be responded to, so that the degree of freedom in designing the switch can be further enhanced.

Figure 8:
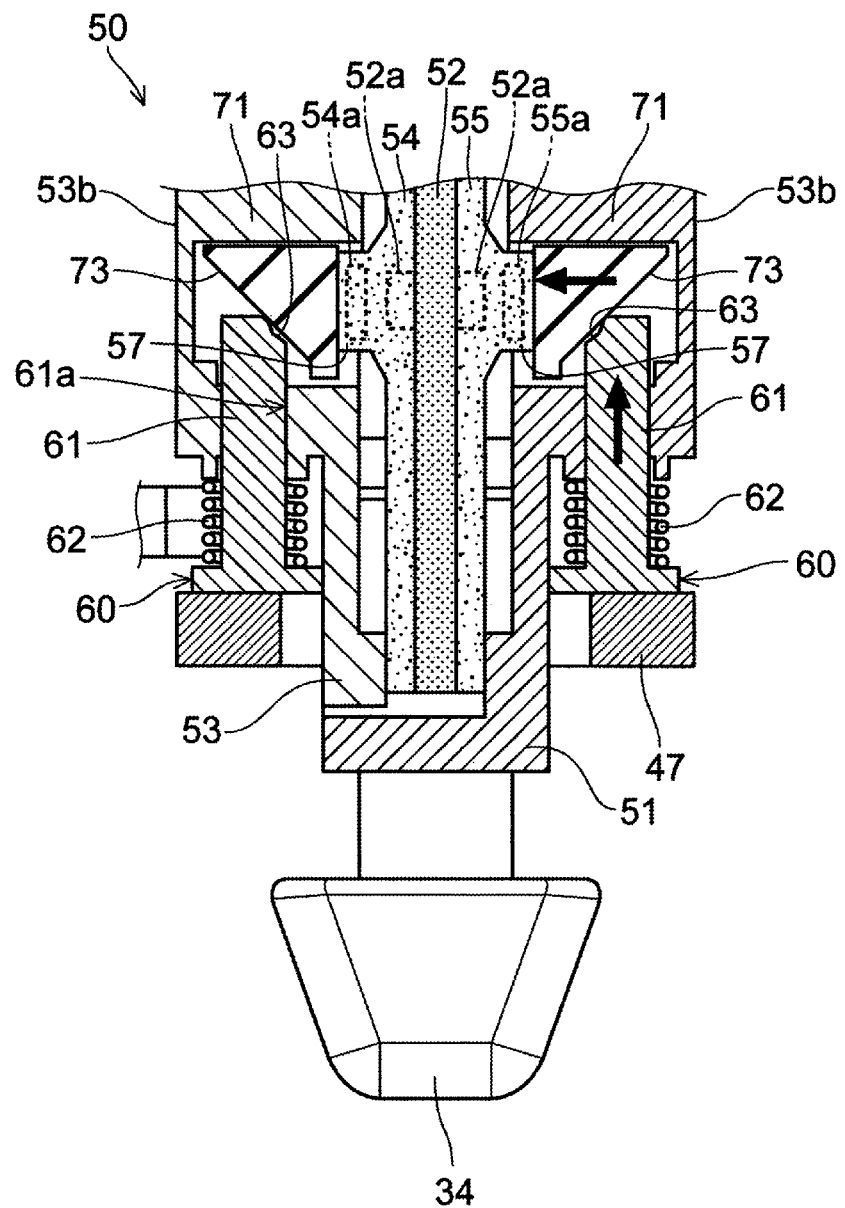
FIG. 8 is a cross-sectional view showing the switch unit.

FIG. 8 is a cross-sectional view showing the switch unit 50. The switch unit 50 will be described below using an exemplary cross-section view showing areas near the turn signal switch 34 and the same major arrangements apply to other portions. The switch unit 50 includes the substrate 52 formed of an electronic substrate and sheet members 54 and 55 formed of a resin, such as rubber, disposed on both sides of the substrate 52. The substrate 52 and the sheet members 54 and 55 are then housed in the box-shaped case member 51 which is, in turn, closed by the lid-shaped case member 53. The foregoing arrangement allows a subassembled switch unit 50 to be built into the switch case 37 easily, so that reduction in the number of production man-hours can be achieved. The substrate 52 sandwiched by the sheet members 54 and 55 is housed in the box-shaped case member 51 which is then closed by the lid-shaped case member 53. This allows end portions of the sheet members 54 and 55 to function as waterproof seals, thus preventing entry of moisture and other foreign matter in the inside of the switch unit 50.

The substrate 52 formed of an electronic substrate has the multiple contacts 52a formed on both sides thereof. The facing contact storage section 57 is formed in the sheet members 54 and 55 at the position corresponding to each of the contacts 52a. Additionally, the facing contact storage section 57 is configured so as to be returned to the neutral position by elasticity of the material used. Each of the direction change mechanism storage sections disposed in the case members 51 and 53 has the through hole 61a formed therein in which the bar-shaped portion of the operator 61 is inserted. Additionally, the turn signal operator 47 is engaged with a holder shaft portion (not shown) supported by the holder 48 (see FIG. 6), which represents an arrangement to enable both the tilting operation and the sliding operation in the vehicle body longitudinal direction.

As described earlier, operating each switch causes the bar-shaped portion of the operator 61 to be pressed into the direction change mechanism storage section. The bar-shaped portion of the operator 61 abuts on the inclined surface portion 73 of the actuator 71 that is inclined by a predetermined angle relative to the substrate 52. The abutment portion changes the direction of the operating force 90 degrees, so that the actuator 71 is pushed in the direction of the substrate 25. The predetermined angle of the inclined surface portion 73 of the actuator 71 is, for example, 45 degrees relative to the axis O. The leading end of the operator 61 may be assigned with a predetermined inclination or a friction reducing form.

The substrate 52 has the multiple contacts 52a disposed on both sides thereof. The disc-shaped facing contact storage sections 57 formed in the sheet members 54 and 55 that abut on the substrate 52 store therein facing contacts 54a and 55a. The actuator 71 that has been pushed in deforms the facing contact storage section 57 formed of, for example, rubber to thereby cause the facing contacts 54a and 55a abut on the contact 52a. The contact 52a is thereby electrically connected. When the pressure operation is released, the operator 61 is brought back to a neutral position by an urging force of the spring member 62. Meanwhile, the facing contact storage section 57 returns to its neutral position by its own elastic force. As such, an independent urging force is applied to each part, so that load is not concentrated on a specific part and operating reliability and part durability can be enhanced.

Figure 9A:
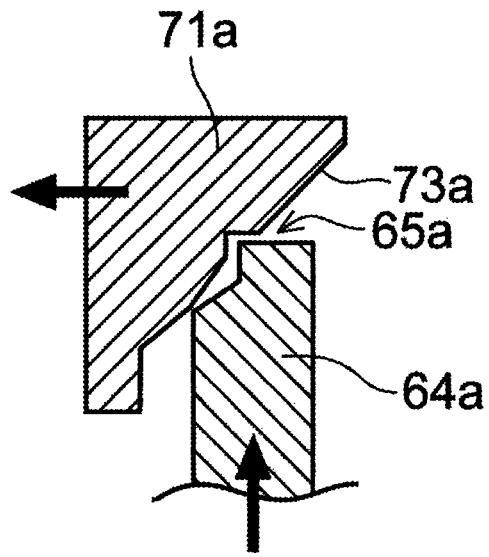
FIGS. 9(a) and 9(b) include cross-sectional views showing modified examples of an actuator and an operator.
Figure 9B:
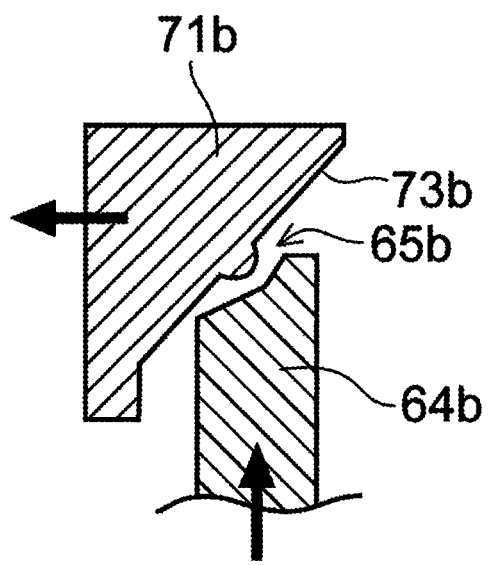

FIGS. 9(a) and 9(b) include cross-sectional views showing modified examples of the actuator and the operator. These modified examples are characterized in that contact surfaces of the actuator and the operator have recess and protrusion parts that are engaged with each other when the operator is pressed. FIG. 9(a) shows a modified example in which recess and protrusion parts 65a are formed between an inclined surface portion 73a of an actuator 71a and an operator 64a, the recess and protrusion parts 65a having rectangular shoulders. FIG. 9(b) shows another modified example in which recess and protrusion parts 65b are formed between an inclined surface portion 73b of an actuator 71b and an operator 64b, the recess and protrusion parts 65b including a hemispherical protrusion on the side of the actuator 71b and a receiving portion on the side of the operator 64b. Such recess and protrusion shapes allow a simple shape to give a click feel when the pressure operation is completed. It is to be understood that the above-described recess and protrusion shapes are not intended to limit the handlebar switch and various changes in form and detail may be made.

The structure of the handlebar switch, the shape and structure of the switch case and the switches, the shape and structure of the switch unit and the substrate, and the switch side direction change mechanism are not limited to those described in the preferred embodiment and various changes may be made. The handlebar switch according to the preferred embodiment of the handlebar switch may be applied to various types of vehicles including saddle riding type three-wheeled and four-wheeled vehicles, in addition to the motorcycle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A handlebar switch for a motorcycle, comprising:
a switch case including
two separate case half bodies joined together so as to surround a handlebar, and
a plurality of operating switches protruding from said switch case, said operating switches operating electric devices of the motorcycle;
a substrate disposed inside said switch case such that a surface of said substrate is substantially orthogonal to a direction of an axis of the handlebar, said substrate having a plurality of contacts generating electric signals in a manner operatively associated with operation of said plurality of operating switches; and
direction change mechanisms which change an operating direction of pressure applied to said plurality of operating switches, and
wherein at least one of said plurality of contacts is disposed on each side of said substrate.

2. The handlebar switch for a motorcycle according to claim 1,
wherein said plurality of contacts are electrically connected by pressure applied in a direction substantially identical to the direction of the axis of said handlebar; and
wherein said direction change mechanisms change a direction of the pressure applied to said operating switch to the direction substantially identical to the direction of the axis of said handlebar.

3. The handlebar switch for a motorcycle according to claim 1,
wherein said direction change mechanisms include
an actuator including an inclined surface portion facing one of said plurality of contacts and capable of moving in the direction substantially identical to the direction of the axis of said handlebar, and
an operator reciprocating in response to an operation of said operating switch and abutting said inclined surface portion of said actuator; and
wherein, as said operating switch is operated, said operator presses said inclined surface portion, thereby pressing said actuator in the direction substantially identical to the direction of the axis of said handlebar.

4. The handlebar switch for a motorcycle according to claim 2,
wherein said direction change mechanisms include
an actuator including an inclined surface portion facing one of said plurality of contacts and capable of moving in the direction substantially identical to the direction of the axis of said handlebar, and
an operator reciprocating in response to an operation of said operating switch and abutting said inclined surface portion of said actuator; and
wherein, as said operating switch is operated, said operator presses said inclined surface portion, thereby pressing said actuator in the direction substantially identical to the direction of the axis of said handlebar.

5. The handlebar switch for a motorcycle according to claim 3, wherein said inclined surface portion is inclined substantially 45 degrees relative to the direction of the axis of said handlebar.

6. The handlebar switch for a motorcycle according to claim 4, wherein said inclined surface portion is inclined substantially 45 degrees relative to the direction of the axis of said handlebar.

7. The handlebar switch for a motorcycle according to claim 3,
wherein each of said plurality of contacts is electrically connectable to a facing contact disposed to face one of said plurality of contacts; and
wherein an urging force is applied at all times to each of said operator and said facing contact in order to return said operator and said facing contact to a neutral position.

8. The handlebar switch for a motorcycle according to claim 4,
wherein each of said plurality of contacts is electrically connectable to a facing contact disposed to face one of said plurality of contacts; and
wherein an urging force is applied at all times to each of said operator and said facing contact in order to return said operator and said facing contact to a neutral position.

9. The handlebar switch for a motorcycle according to claim 7,
wherein the urging force is applied to said operator by a spring member; and
wherein the urging force is applied to said facing contact by a sheet member on which said facing contact is disposed.

10. The handlebar switch for a motorcycle according to claim 8,
wherein the urging force is applied to said operator by a spring member; and
wherein the urging force is applied to said facing contact by a sheet member on which said facing contact is disposed.

11. The handlebar switch for a motorcycle according to claim 1, wherein said substrate is formed so as to surround an outer peripheral portion of said handlebar, extending across said two separate case half bodies of said switch case.

12. The handlebar switch for a motorcycle according to claim 3, wherein said operator and said inclined surface portion of the actuator respectively have recess and protrusion parts that are engaged with each other when said operator is pressed.

13. The handlebar switch for a motorcycle according to claim 4, wherein said operator and said inclined surface portion of the actuator respectively have recess and protrusion parts that are engaged with each other when said operator is pressed.

14. The handlebar switch for a motorcycle according to claim 3, further comprising:
sheet members disposed on both sides of said substrate and on which facing contacts are disposed,
case members disposed on an outside of the sheet members and in which the direction change mechanisms are disposed; and
a switch unit disposed inside said switch case, said switch unit including said substrate, said sheet members, and said case members.

15. The handlebar switch for a motorcycle according to claim 4, further comprising:
sheet members disposed on both sides of said substrate and on which facing contacts are disposed, case members disposed on an outside of the sheet members and in which the direction change mechanisms are disposed; and a switch unit disposed inside said switch case, said switch unit including said substrate, said sheet members, and said case members.

16. The handlebar switch for a motorcycle according to claim 1, wherein said operating switches include a turn signal switch configured such that turn signal operators disposed on both sides of said substrate can press contacts among said plurality of contacts disposed on both sides of said substrate.

* * * * *